US007526634B1

(12) United States Patent
Duluk, Jr. et al.

(10) Patent No.: US 7,526,634 B1
(45) Date of Patent: Apr. 28, 2009

(54) COUNTER-BASED DELAY OF DEPENDENT THREAD GROUP EXECUTION

(75) Inventors: Jerome F. Duluk, Jr., Palo Alto, CA (US); Stephen D. Lew, Sunnyvale, CA (US); John R. Nickolls, Los Altos, CA (US)

(73) Assignee: Nvidia Corporation, Santa Clara, CA (US)

( * ) Notice: Subject to any disclaimer, the term of this patent is extended or adjusted under 35 U.S.C. 154(b) by 229 days.

(21) Appl. No.: 11/535,871

(22) Filed: Sep. 27, 2006

Related U.S. Application Data

(63) Continuation-in-part of application No. 11/312,002, filed on Dec. 19, 2005.

(51) Int. Cl.
*G06F 9/40* (2006.01)
(52) U.S. Cl. ...................................... 712/216; 718/102
(58) Field of Classification Search ................. 712/216; 718/102, 106
See application file for complete search history.

(56) References Cited

U.S. PATENT DOCUMENTS 6,026,427 A * 2/2000 Nishihara et al. ........... 718/106
6,477,561 B1 * 11/2002 Robsman ..................... 718/105
6,983,462 B2 * 1/2006 Savov et al. ................. 718/104
7,356,666 B2 * 4/2008 Kanai et al. ................. 711/202
2002/0174318 A1 11/2002 Stuttard et al.
2005/0262159 A1 * 11/2005 Everhart et al. ............. 707/201

OTHER PUBLICATIONS

Thornley et al., "Monotonic Counters: A New Mechanism for Thread Synchronization," 2000, 10 pages.*
S.J. Eggers et al., "Simultaneous Multithreading: A Platform for Next-Generation Processors" IEEE Micro, Sep.-Oct. 1997, p. 12-19.

* cited by examiner

*Primary Examiner*—David J Huisman
(74) *Attorney, Agent, or Firm*—Townsend and Townsend and Crew LLP

(57) ABSTRACT

Systems and methods for synchronizing processing work performed by threads, cooperative thread arrays (CTAs), or "sets" of CTAs. A central processing unit can load launch commands for a first set of CTAs and a second set of CTAs in a pushbuffer, and specify a dependency of the second set upon completion of execution of the first set. A parallel or graphics processor (GPU) can autonomously execute the first set of CTAs and delay execution of the second set of CTAs until the first set of CTAs is complete. In some embodiments the GPU may determine that a third set of CTAs is not dependent upon the first set, and may launch the third set of CTAs while the second set of CTAs is delayed. In this manner, the GPU may execute launch commands out of order with respect to the order of the launch commands in the pushbuffer.

18 Claims, 5 Drawing Sheets

COUNTER-BASED DELAY OF DEPENDENT THREAD GROUP EXECUTION

CROSS-REFERENCES TO RELATED APPLICATIONS

The present application is a continuation-in-part and claims priority to commonly-assigned co-pending U.S. patent application Ser. No. 11/312,002, filed Dec. 19, 2005, entitled "Pushbuffer Launching of Processor Threads," the disclosure of which is incorporated for all purposes as if set forth fully herein. The present application is also related to commonly-assigned co-pending U.S. patent application Ser. No. 11/457,084 filed Jul. 12, 2006, entitled "Predicated Launching of Compute Thread Arrays," the disclosure of which is incorporated for all purposes as if set forth fully herein.

BACKGROUND OF THE INVENTION

The present invention relates in general to data processing, and in particular to synchronization of computing thread arrays.

Parallel processing techniques enhance throughput of a processor or multiprocessor system when multiple independent computations need to be performed. A computation can be divided into tasks, with each task being performed as a separate "thread." (As used herein, a thread refers generally to an instance of execution of a particular program using particular input data.) Parallel threads are executed simultaneously using different processing engines, allowing more processing work to be completed in a given amount of time.

A pushbuffer is a means for one processor to send data and commands to another processor, providing a first-in-first-out (FIFO) queue, but not necessarily implemented as a hardware FIFO. For example, in a typical personal computer system with a central processing unit (CPU) and a parallel or graphics processing unit (GPU), the CPU writes commands and data for parallel or graphics processing into the pushbuffer and the GPU processes the data and commands in the same order in which they were written. The data and commands in the push buffer typically reside in either the system memory or in the memory attached to the GPU. Software running on the CPU writes the data and commands into memory, and typically also updates registers in the GPU so as to indicate more data and commands have been written to the pushbuffer. The GPU reads from the pushbuffer, often via DMA block transfers, in order to utilize memory bandwidth efficiently. The pushbuffer may vary in size from a few bytes up to many megabytes, and could be even larger on future systems. Systems may use multiple pushbuffers, and the CPU may also write information to the GPU without using the pushbuffer.

BRIEF SUMMARY OF THE INVENTION

As described further herein, a system includes a processor that executes multiple threads (e.g., a parallel or graphics processing unit, referred to herein as a GPU). The system may also include a general-purpose processing unit (CPU) or control processor. The CPU or control processor writes state information for launching a thread, cooperative thread array (CTA, a group of multiple threads that concurrently execute the same program on input data to produce output data), or "grid" of CTAs (a set of CTAs with a D-dimensional arrangement) to a pushbuffer in memory. The GPU reads the pushbuffer and launches the thread, CTA, or grid of CTAs.

The present disclosure includes systems and methods for synchronizing processing work performed by threads, CTAs, or sets of CTAs. For example, a dependency can be specified wherein a second set of CTAs is dependent upon completion of execution of a first set of CTAs. The CPU can load, into the pushbuffer, launch commands for the first set of CTAs and the second set of CTAs, and also specify a dependency of the second set upon the first set. With the launch commands and dependency specified in the pushbuffer, the GPU can autonomously execute the first set of CTAs and delay execution of the second set of CTAs until the first set of CTAs is complete.

In addition, in some embodiments the GPU may determine that a third set of CTAs is not dependent upon the first set, and may launch the third set of CTAs while the second set of CTAs is delayed. In this manner, the GPU may execute launch commands out of order with respect to the order of the launch commands in the pushbuffer.

Advantageously, the pushbuffer essentially operates as a queue for commands to launch threads in the parallel or graphics processor. The pushbuffer allows the CPU to work asynchronously of the GPU, so that the GPU can lag behind the CPU, catch up to the CPU, and so on. Since the GPU can be more expensive than the CPU, it is advantageous to use the pushbuffer to keep the GPU as busy as possible. That is, when the GPU completes a set of computations, it does not need to wait for the CPU or control processor to issue new work, since the GPU can read its next computational task from the push-buffer.

Thus in one aspect, a method comprises executing a first set of thread arrays in a parallel or graphics processor; specifying a second set of thread arrays as dependent on a status of execution of the first set of thread arrays; and delaying execution of the second set of thread arrays in the parallel or graphics processor based on the status of execution of the first set of thread arrays.

In another aspect, a method comprises loading from a central processing unit into a pushbuffer coupled to a processing unit a first launch command for a first process, a second launch command for a second process, and a dependency between the first process and the second process. The method includes executing the first launch command in the processing unit and delaying execution of the second command in the processing unit based on the dependency.

In a further aspect, a method comprises loading from a central processing unit into a pushbuffer coupled to a processing unit a first launch command for a first process, then a second launch command for a second process, including a dependency between the second process and the first process; then a third launch command for a third process. The method includes executing the first launch command in the processing unit to complete the first process, delaying execution of the second command in the processing unit based on the dependency, and executing the third launch command while the second process is delayed.

The following detailed description together with the accompanying drawings will provide a better understanding of the nature and advantages of the present invention.

DETAILED DESCRIPTION OF THE INVENTION

As described further herein, a pushbuffer for launching threads, cooperative thread arrays (CTAs), or grids of CTAs for parallel computing is quite different from a conventional graphics pushbuffer used for 3-D graphics processing. In 3-D graphics processing, a graphics pushbuffer between a CPU and GPU simplifies processing in the CPU and passing of data between the CPU and the GPU. For example, in one type of triangle drawing mode, the CPU writes a list of vertex indices to the graphics pushbuffer. The GPU reads the vertex indices from the graphics pushbuffer when the CPU sends a "draw N vertices in index mode" command to the GPU. Based upon topology and other state data that has been passed from the CPU to the GPU via the pushbuffer, plus additional information (e.g., vertex position, vertex color, texture coordinates, and so on) not contained in the graphics pushbuffer or in the draw command, the GPU renders vertices from the graphics pushbuffer to a display.

However, in a conventional graphics pushbuffer there is no mechanism by which the CPU can command the GPU to perform general-purpose parallel computing. For example, there is no direct mechanism that allows the processor to launch N threads or groups of threads worth of computation and return the result to the CPU. In addition, there is no mechanism in a conventional graphics pushbuffer by which a number of threads or thread arrays may be synchronized, as described further below.

System Overview

FIGS. 1 through 6 illustrate exemplary parallel processing architectures and techniques for synchronization of computing thread arrays. However, the systems and methods disclosed herein for are not limited to any particular processing architecture. For example, the architecture described herein includes a computer system with a central processing unit (CPU) and a parallel or graphics processing unit (GPU) that supports parallel processing applications. However, the methods described herein are not limited to application on a GPU and instead are applicable to virtually any processing device. Further, as described below, the architecture of the GPU includes a hierarchical arrangement for parallel processing of threads (lowest level), single-instruction multiple data (SIMD) groups of a number (e.g. 16) of threads, cooperative thread arrays (CTAs) of a number of threads (higher level), and "grids" or sets of CTAs, although the techniques described herein may be applied to processing of threads in non-hierarchical or "flat" arrangement.

Figure 1:
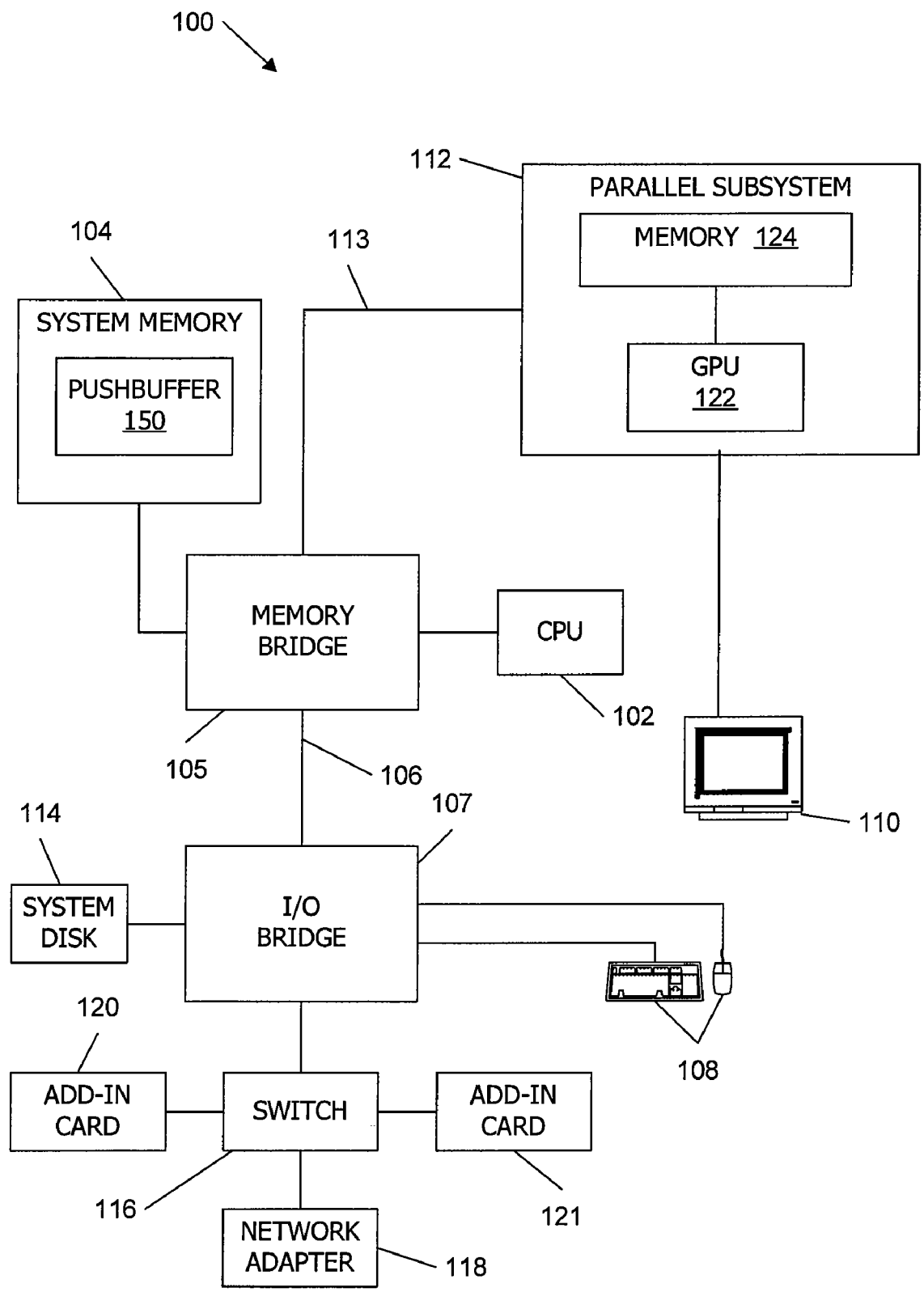
FIG. 1 is a block diagram of a computer system 100 according to an embodiment of the present invention.

FIG. 1 is a block diagram of a computer system 100 according to an embodiment of the present invention. Computer system 100 is merely exemplary, and a number of alterations may be made to computer system 100. Computer system 100 includes a central processing unit (CPU) or control processor 102 and a system memory 104 communicating via a communications path that may include a memory bridge 105. Memory bridge 105 (e.g. a Northbridge chip) is connected via a communication path 106 (e.g., a point-to-point connection using the HyperTransport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output may be provided on a pixel based display device 110 (e.g., a CRT or LCD based monitor) operating under control of a parallel or graphics subsystem 112 coupled to CPU 102 or memory bridge 105 via communication path 113, which may be implemented using, e.g., PCI Express (PCI-E), HyperTransport, or any other point-to-point or interconnect protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or interconnect protocol(s), and connections between different devices may use different protocols as is known in the art.

Parallel processing subsystem 112 includes a number N of parallel or graphics processing units (GPU) 122 and memories 124, which may be implemented, e.g., using one or more integrated circuit devices such as programmable processors, application specific integrated circuits (ASICs), and memory devices. Each GPU 122 may execute general parallel processing applications, or be configured to perform various tasks related to generating pixel data from graphics data supplied by CPU 102 and/or system memory 104 via memory bridge 105 and bus 113, interacting with memories 124 to store and update pixel data, and the like. For example, GPU 122 may generate pixel data from 2-D or 3-D scene data provided by various programs executing on CPU 102.

CPU 102 operates as the control processor of system 100, controlling and coordinating operations of other system components. In particular, CPU 102 issues commands that control the operation of GPU 122.

In some embodiments, CPU 102 writes a stream of commands for GPU 122 to a command buffer or "pushbuffer" 150. Although pushbuffer 150 is depicted as within system memory 104, pushbuffer 150 may alternatively reside in memory 124, another storage location in system 100 that is accessible to both CPU 102 and GPU 122, or may reside in any combination of system memory 104, memory 124, or other storage locations.

As described further below, pushbuffer 150 operates as a first-in, first-out FIFO buffer for thread launch commands and other commands to GPU 122. GPU 122 reads the command stream from the pushbuffer (e.g., by direct memory access or DMA) and executes commands asynchronously with respect to operation of CPU 102.

Processing Pipeline for Graphics and Compute Program Classes in GPU

Figure 2:
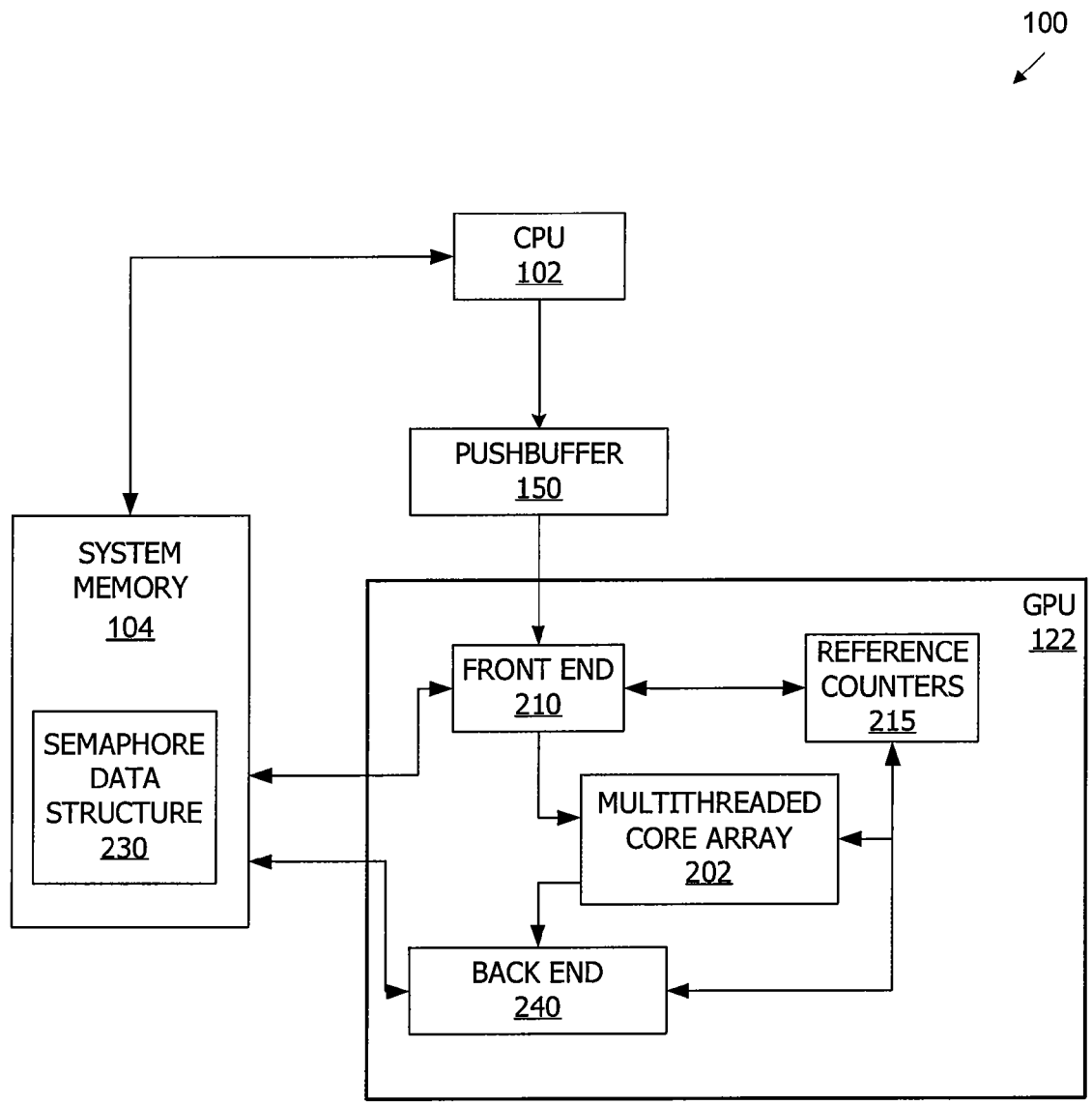
FIG. 2 is a generalized block diagram showing further detail of GPU 122 of FIG. 1 according to an embodiment of the present invention.

FIG. 2 is a generalized block diagram showing further detail of GPU 122 of FIG. 1 according to an embodiment of the present invention.

As noted with respect to FIG. 1, CPU 102 issues initialization and launch commands for GPU 122 via pushbuffer 150. As described further herein, depending on state information loaded into pushbuffer 150, front end 210 of GPU 122 loads and launches threads, CTAs, or grids of CTAs until all threads have been launched in multithreaded core array 202. Front end 210 tracks execution status of the threads, CTAs, or grids of CTAs using one or more (e.g., four) reference counters 215. In some embodiments, each of the reference counters 215 includes a launch counter and a completion counter (not shown in FIG. 2 for the sake of clarity).

Back end 240 is configured to write data to a semaphore data structure 230 (among other functions considered extraneous to the present disclosure). Semaphore data structure 230 may be included in system memory 104, memory 124 (e.g., frame buffer), or any combination of storage locations in system 100. As described further below, semaphore data structure 230 is a mechanism by which separate processes running on CPU 102 and/or GPU 122 can synchronize process execution.

As described further below, GPU 122 is configured to execute program threads in a "compute class," a "graphics class," and/or other classes of programs.

Programs in the compute class allow GPU 122 to provide general-purpose parallel computations (e.g., computing Fourier transforms of data arrays or modeling the physics of moving and colliding objects) for CPU 102. Programs in the compute class also allow GPU 122 to provide general-purpose computations for other processes, such as graphics class programs, running on GPU 122. Programs in the compute class use many or all of the same processing resources employed for graphics class processing, as described further below.

In the graphics program class, GPU 122 provides graphics processing for applications such as vertex shader programs, geometry shader programs, and pixel shader programs using parallel processing hardware, referred to herein as a "multithreaded core array" 202. GPU 122 provides graphics processing by way of a rendering pipeline, a shading module, and frame buffer (not shown). In one embodiment, multithreaded core array 202 provides a highly parallel architecture that supports concurrent execution of a large number of instances of programs in various combinations. Detailed descriptions of such graphics processing components are not included herein so as to focus on synchronization of computing thread arrays.

Multithreaded core array 202 is configured to execute multiple threads in parallel in some embodiments. E.g., during a graphics rendering operation, a thread might be an instance of a vertex shader program executing on attributes of a single vertex or an instance of a pixel shader program executing on a given primitive and pixel. During general-purpose computing of compute class programs, a thread can be an instance of a CTA program executing on a portion of input data and/or producing a portion of output data. In multithreaded core array 202, single-instruction, multiple-data (SIMD) instruction issue techniques support parallel execution of multiple threads by multiple processing engines without requiring multiple instruction units. In various embodiments, multiple cores within GPU 122 may support parallel execution of multiple CTAs, one core may execute more than one CTA at a time depending on the resources required per CTA, and multiple GPUs 122 within system 100 may support parallel execution of additional CTAs.

In some embodiments, computations are executed by GPU 122 in one or more cooperative arrays of threads (CTA). A CTA can implement algorithms using a wide range of mathematical and logical operations, and the program for each thread of a CTA can include conditional or branching execution paths and direct and/or indirect memory access. Threads in a CTA can share intermediate results with other threads in the same CTA, and threads of one CTA can share results with threads of another CTA in some embodiments.

CTAs and grids of CTAs may be advantageously employed to perform computations that lend themselves to a data parallel decomposition, i.e., application of the same processing algorithm to different portions of input data in order to effect a transformation of the input data to output data, and/or to producing different portions of output data. The processing algorithm is specified in a "CTA program," and each thread in the CTA executes the same CTA program on a different portion of the input data and/or output data. The CTA program can implement algorithms using a wide range of mathematical and logical operations, and the CTA program can include conditional or branching execution paths and direct and/or indirect memory access.

The size of a CTA and number of CTAs required for a particular application may depend on the application. Thus, the size of a CTA, as well as the number of CTAs to be executed, may be defined by the programmer and provided to GPU 122 as state parameters. CTAs are described in further detail in co-pending application Ser. No. 11/305,178, entitled, "Parallel Data Processing Systems and Methods Using Cooperative Thread Arrays," filed Dec. 15, 2005, incorporated by reference herein for all purposes.

"State information," as used herein, includes any information (other than input data) relevant to defining a CTA or grid of CTAs. For example, in one embodiment, state information includes parameters that define the size of the CTA, the amount of register file space required for each thread, a starting program counter (e.g., memory address) for a program to be executed by each thread, and selection of hardware resource allocation algorithms. Parameters may be specified in the state information so that, before launching a CTA, CPU 102 provides a list of parameters to each CTA (akin to passing arguments to a function call). Each CTA can therefore receive a list of parameters, including CTA identification parameters, e.g. a CTA ID number, controlled via commands in the pushbuffer 150.

State information may also include size information for the number of threads per CTA (e.g., 256 threads per CTA) and the size of a CTA grid (a "grid" of CTAs typically includes multiple CTAs of same dimension that all execute the same program, often for input data that is too big for a single CTA to handle efficiently, and that can be processed independently. The size of the CTA grid specifies how many CTAs are in the grid). In some embodiments, the total number (T) of threads is also provided; in other embodiments, T can be computed from the array dimensions.

Launching a thread or CTA includes supplying, via front end 210 from pushbuffer 150 into GPU 122, state information, input data, and any other parameters required to execute the program. For example, in the case of CTA processing, front end 210 loads the starting PC value for the CTA program into a slot in a program counter array (not shown) that is not currently in use. Depending on state information from pushbuffer 150, front end 210 can allocate space in one or more register files (not shown) for each processing engine of GPU 122 to execute one CTA thread and load the input data into shared memory. Once the input data for threads have been loaded, front end 210 launches the group of threads by signaling an instruction unit in GPU 122 to begin fetching and issuing instructions.

GPU-to-CPU Synchronization with Semaphores

In some applications, it is advantageous for CPU 102 to load launch commands for a first process into pushbuffer 150, and wait for completion of the first process by GPU 122 before loading launch commands for a second process. In such case, semaphore data structure 230 provides a communication mechanism between CPU 102 and GPU 122.

In general, semaphores allow two processes to negotiate access to a resource. For example, two asynchronous processes, process1 and process2 may need to synchronize writing to a buffer in memory. Once process1 has finished writing to the buffer, process1 writes a "semaphore release". Process2 may perform a "semaphore acquire" to poll whether process1 has finished writing to the buffer.

Therefore, GPU 122 and CPU 102 can synchronize via semaphore data structure 230. GPU 122 can perform a semaphore release by writing to semaphore data structure 230 upon completion of the first process, to signal to CPU 102 that GPU 122 has resources available for launching the second process, or to signal to CPU 102 that GPU 122 has generated output that can be read by the CPU 102. In some embodiments, semaphore data structure 230 includes a 32-bit field for a report (not shown) which may include information such as status (e.g. memory overflow) and a timestamp (e.g., with 64-bits of resolution). However, semaphore data structure 230 can include other information and any number of bits for the report.

Further, although only a single semaphore data structure 230 is depicted in FIG. 2 for the sake of clarity, but there may be a large number of semaphore data structures 230 in system memory 104 or other memories of system 100. In some embodiments with large numbers of semaphore data structures 230, a particular semaphore data structure may be accessed by specifying an offset from a base address within system memory 104 (e.g., a 40-bit address that indicates a starting address for a memory range that includes the semaphore data structure 230).

Generally, semaphores are read by periodic polling of the semaphore data structure 230. For efficient communication within system 100, semaphore data structure 230 should be stored where it is most efficient for the component reading the semaphore. For example, if CPU 102 is reading semaphore data structure 230 repeatedly, waiting for GPU 122 to indicate that processing has completed for a process, system memory 104 provides an efficient storage location for semaphore data structure 230, since system memory 104 is relatively "close" to CPU 102.

GPU Inter-Process Synchronization with Semaphores

In some applications, it is advantageous for CPU 102 to load launch commands for a first process and a second process into pushbuffer 150, and specify the starting of the second process to wait for completion of the first process. In such case, the first process is associated with a semaphore release that writes a semaphore data structure 230, and pushbuffer commends instruct the front end 210 to perform a semaphore acquire before decoding any commands associated with the second process.

"Sets" of CTAs

Figure 3:
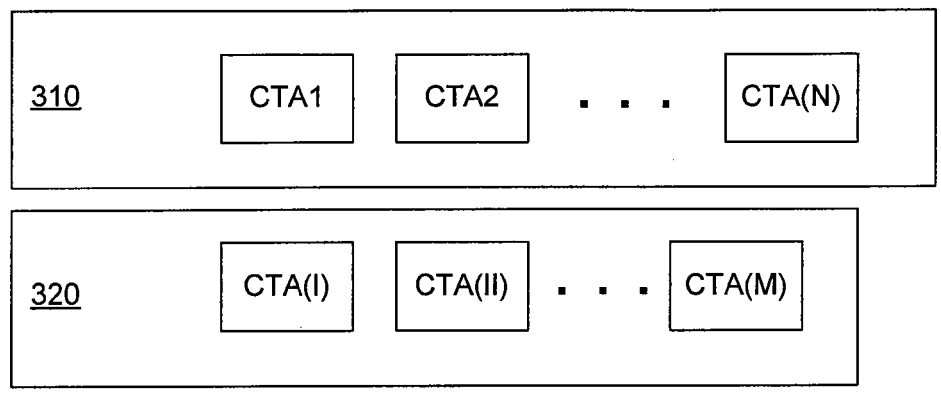
FIG. 3 illustrates two sets 310 and 320 of CTAs, in one embodiment in accordance with the present invention.

FIG. 3 illustrates two sets 310 and 320 of CTAs, in one embodiment in accordance with the present invention. A CTA may be a single thread, or a group of cooperating threads, which perform a computation. Set 310 includes a number N of CTAs, labeled CTA1, CTA2, to CTA(N). Set 320 includes a number M of CTAs, labeled CTA(I), CTA(II), to CTA(M). A set may have a single CTA or any integer number of CTAs. A set of CTAs may be arranged in an D-dimensional grid of CTAs.

As used herein, a "set" is used to indicate whether a dependency exists between CTAs. There is no dependency among CTAs within a set, but a dependency does exist between sets, such that a second set of CTAs may depend upon completion of execution of a first set of CTAs.

For example, none of the CTAs within set 310 is dependent upon any other of the CTAs within set 310. GPU 122 may, depending on resources, execute one or more of the CTAs of set 310 in parallel.

Similarly, none of the CTAs within set 320 is dependent upon any other of the CTAs within set 320. However, one or more of the CTAs of set 320 is dependent upon completion of execution of all of the CTAs of set 310, such that set 320 cannot properly execute until all N CTAs of set 310 have completed execution.

Examples of Synchronization Between Sets of CTAs

Synchronization of sets of CTAs can be advantageously specified using pushbuffer 150, for example where set 320 is dependent upon completion of all N CTAs of set 310. For example, because GPU 122 is highly parallelized and pipelined such that several or many of the CTAs of set 310 can be executed in parallel, if CTAs 1, 2, ... N of set 310 are launched sequentially, the completion order of the CTAs of set 310 may be different than the order in which the CTAs of set 310 are launched. Thus, if set 320 depends upon the completion of execution of all of the CTAs of set 310, then set 320 cannot wait merely for CTA(N) (the last launched CTA of set 310) to finish execution. Rather, set 320 must wait for the last CTA that finishes execution within set 310.

Therefore, in one embodiment, reference counters 215 of GPU 122 (FIG. 2) may be used to synchronize sets of CTAs. In one embodiment, up to four reference counters 215 are provided, although there is no particular limit to the number of reference counters 215 within GPU 122. As noted above, each reference counter 215 can include a launch counter and a completion counter. A different one of the reference counters 215 is assigned to each set of CTAs that is depended upon by another set of CTAs.

Each time GPU 122 launches a CTA, logic in GPU 122 increments the launch counter for the assigned reference counter 215. For example, after all of the N CTAs of set 310 have been launched, the launch counter assigned to set 310 equals N. The completion counter of the assigned reference counter 215 is incremented every time a CTA completes execution (after executing its last instruction), so that after all CTAs of set 310 have completed execution for example, the completion counter assigned to set 310 equals N.

When the launch counter equals the completion counter, this referred to as the "quiescent" state, meaning that there are no actively executing CTAs with the assigned reference counter 215. The quiescent state indicates that all of the launched CTAs have finished execution, which may be used to indicate than a set of N CTAs has completed execution (after its launch command completes). For example, CTA set 310 of 100 CTAs (N=100) may be associated with reference counter 215(1) (the first of four reference counters 215). As CTAs launch within CTA set 310, the launch counter for reference counter 215(1) counts up to 100 launches. Similarly, the completion counter for reference counter 215(1) counts up to 100 completions as CTAs complete processing within CTA set 310. After the launch command completes, when the launch counter equals the completed counter for reference counter 215(1), the status is "quiescent" meaning that the set or grid of 100 CTAs has completed processing.

Note that the quiescent state may be seen many times before all CTAs of a set have been launched, such that verifying the quiescent state does not verify that all CTAs in the set were actually launched; that requires first waiting for the launch command to finish launching all N CTAs. For example, given resources in GPU 122, CTA1 through CTA3 of set 310 may have been launched and finished execution before CTA4 is launched, so that the quiescent state is reached before all N CTAs of set 310 have been launched.

There are several methods to verify that fewer than N CTAs of a set have completed processing. For example, a value of reference counter assigned to set 310 can be compared to a predetermined value. For example, to wait until at least a predetermined number "X" of CTAs of set 310 have completed processing, the value of the completion counter of reference counter 215(1) may be arithmetically compared to X, as well as comparing it to the launch counter. However, performing a straight arithmetic comparison may be problematic where the reference counter 215 may overflow to zero and/or where it would be inefficient to reset the reference counter 215 without stalling processing or incurring race conditions.

In such cases, a "clock hand" comparison may be advantageous, as is known in the art. In one embodiment, each launch and completion counter of each reference counter 215 is a 32-bit counter, counting up to $2^{32}-1$ and then overflowing to zero. If the difference between the 32-bit counter value and a predetermined 32-bit comparison value is less than $2^{31}$ using unsigned 32-bit comparison logic, then the clock hand comparison indicates completion.

In an embodiment with multiple reference counters 215 in GPU 122, a counter ID provides an index to a specific reference counter 214. The index or ID allows further operations using one or more specific reference counters 215. For example as described further below with respect to FIG. 6, where reference counters 215(1), 215(2), and 215(3) are assigned to track launch and completion status of CTAs within three sets 1, 2, and 3 of CTAs, respectively, the completion status of reference counters 215(1), 215(2), and 215(3) can be selectively masked and combined with an AND operation, thereby providing an indication that all three sets of CTAs have completed execution.

Figure 4:
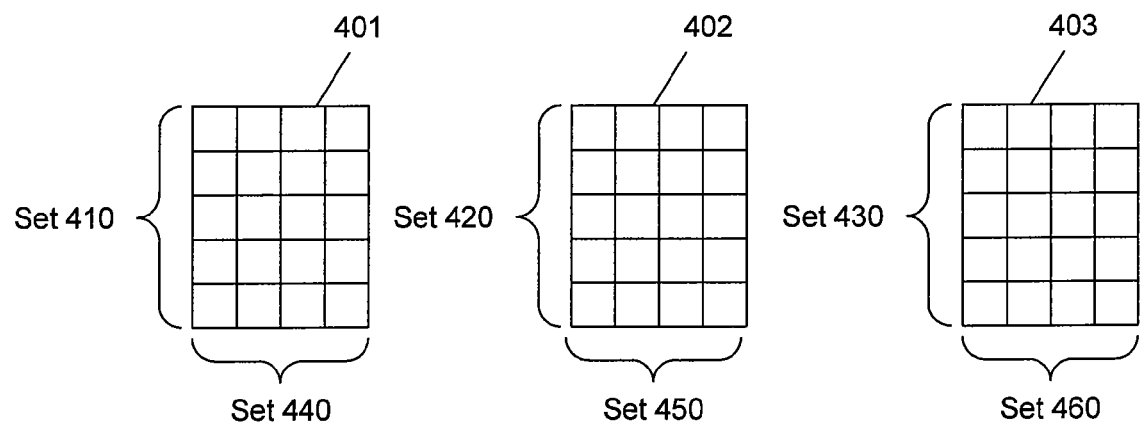
FIG. 4 illustrates processing with several sets of CTAs 410, 420, 430, 440, 450, and 460 on arrays of data 401, 402, and 403, in one embodiment in accordance with the present invention.

FIG. 4 illustrates processing with several sets of CTAs 410, 420, 430, 440, 450, and 460 on arrays of data 401, 402, and 403, in one embodiment in accordance with the present invention. Although sets 410, 420, and 430 are depicted as operating on like-sized arrays 401, 402, and 403, the sets may be of different sizes of CTAs, and there is no requirement that sets are arranged with any particular constraints. Further, there is no requirement that sets complete processing in a particular order or time relationship.

In the exemplary processing depicted in FIG. 4, which computes a two-dimensional Fourier transform by computing one-dimensional transforms on rows and then on columns, Fourier row transforms are first computed on all rows of arrays 401, 402, and 403, by sets 410, 420, and 430 respectively. Following the computation of row transforms, Fourier column transforms are computed on the results of the row computations, in columns of arrays 401, 402, and 403, by sets 440, 450, and 460 respectively. In other words, set 440 cannot begin processing until set 410 has completed processing. Similarly, sets 450 and 460 cannot begin processing until sets 420 and 430, respectively, have completed processing.

Therefore, set 410 executes a Fourier transform on rows of array 401 and is assigned to use reference counter 215(1). Set 420 executes a Fourier transform on rows of array 402, using reference counter 215(2). Since the transforms performed by set 420 on rows of array 402 are independent of the transforms performed by set 410 on rows of array 401, and because distinct reference counters 215 are assigned to sets 410 and 420, set 420 may execute in GPU 122 in parallel with set 410. Similarly, set 430 executes a Fourier transform on rows of array 403, using reference counter 215(3), and may execute in GPU 122 in parallel with set 410 and set 420.

Because columns of array 401 cannot be processed until after row transforms have completed processing, set 440 will not begin executing until reference counter 215(1) indicates that set 410 has completed processing. Similarly, sets 450 and 460 will not begin processing until sets 420 and 430 have completed processing, as indicated by reference counters 215 (2) and 215(3), respectively.

Advantageously, although launch commands for sets 440, 450, and 460 may have been loaded in sequential order into pushbuffer 150, because the execution completion of sets 410, 420, and 430 may occur out of order, it is possible that set 450, for example, may begin processing before set 440 begins processing. Note that, if only one reference counter 215 had been assigned to sets 410, 420, and 430, such that set 440 could not start computing on columns until all of sets 410, 420, and 430 had completed processing, idle periods may result in GPU 122, wasting computing resources. Therefore, by assigning separate reference counters 215 to each of sets 410, 420, and 430, resources in GPU 122 may be used more efficiently as compared to waiting for GPU 122 to become idle before launching sets 440, 450, and 460, for example.

Autonomous Launch in GPU 122

As described further below, CPU 102 can load multiple launch commands and specify dependencies between sets in pushbuffer 150 so that GPU 122 can autonomously determine which commands to execute and in what order. For example, with respect to FIG. 4, it may take thousands or millions of instruction cycles for set 410 to complete processing in GPU 122 before set 440 can execute.

One method of synchronizing execution is for CPU 102 to load launch commands for set 410 into pushbuffer 150, and upon a semaphore release from GPU 122 via semaphore data structure 230, CPU 102 could load launch commands for set 440 into pushbuffer 150. Another method is for GPU 122 to go idle after computing set 410, so that CPU 102 could note the idle status of GPU 122 before loading launch commands for set 440 into pushbuffer 150. However, waiting for a semaphore release before issuing launch commands, or allowing GPU 122 to go idle between completing execution of set 410 and launching of set 440, makes inefficient use of processing resources in system 100.

Instead, CPU 102 can load launch commands for each of the sets 410 to 460 into pushbuffer 150, and additionally CPU can specify dependencies between the sets. Thereafter, GPU 122 can launch the sets 410 to 460 autonomously, and even out of order with respect to the order of the launch commands in pushbuffer 150, as described with respect to FIGS. 5 and 6.

Figure 5:
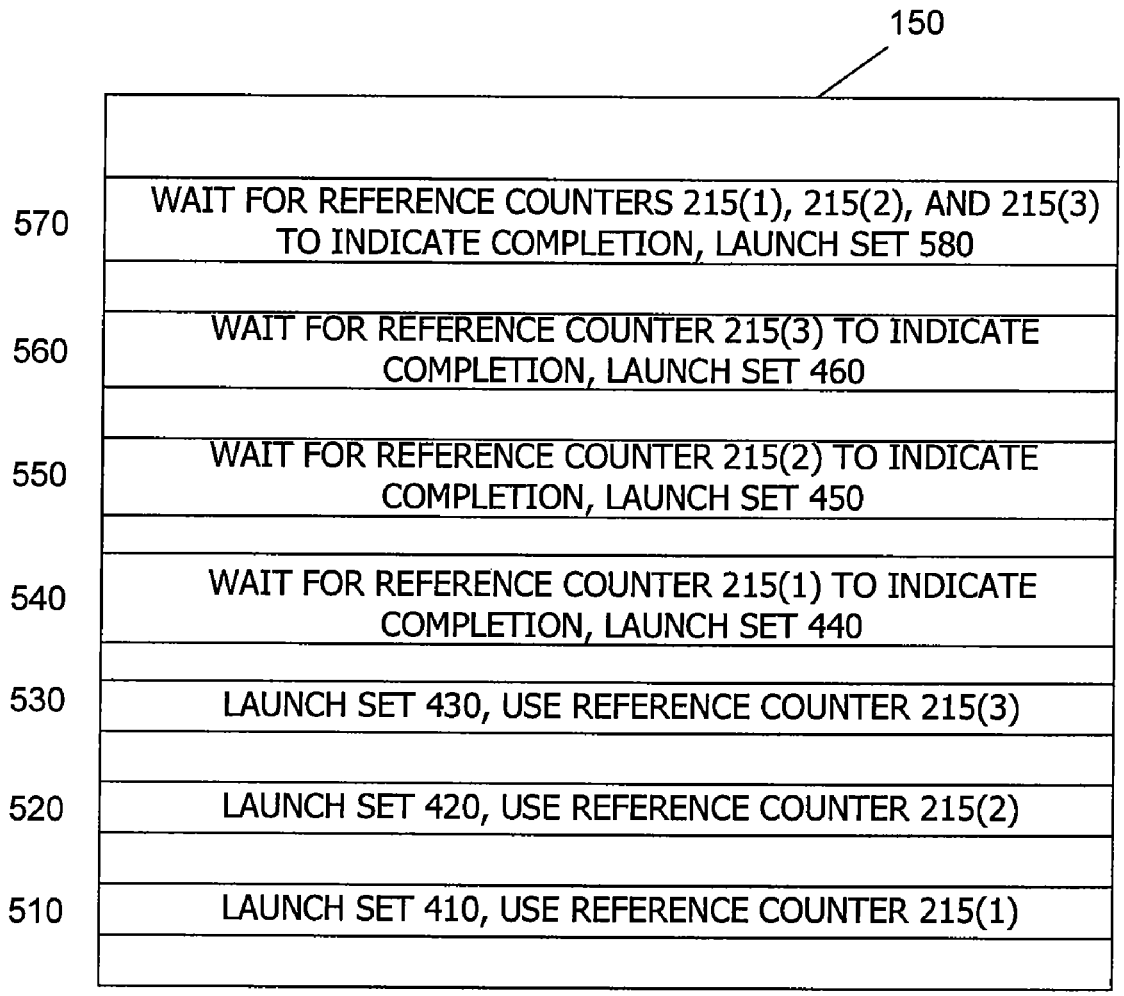
FIG. 5 illustrates a sequence of pushbuffer 150 commands loaded by CPU 102 for sets 410 through 460 of FIG. 4, with dependencies specified between sets, in one embodiment in accordance with the present invention.

FIG. 5 illustrates a sequence of pushbuffer 150 commands loaded by CPU 102 for sets 410 through 460 of FIG. 4, with dependencies specified between sets, in one embodiment in accordance with the present invention. Note that for clarity, the commands depicted in pushbuffer 150 include launch commands combined with dependencies (e.g., command 550 includes a command that specifies a wait for reference counter 215(2) and a launch command for set 450), however, the commands and dependencies are entered into pushbuffer 150 as separate commands in some embodiments.

Referring to FIGS. 4 and 5, commands 510, 520, and 530 in pushbuffer 150 are sequentially-loaded launch commands for sets 410, 420, and 430, respectively. Commands 510, 520, and 530 specify that sets 410, 420, and 430 are to use reference counters 215(1), 215(2), and 215(3), respectively.

Because pushbuffer 150 can be considered as a FIFO with respect to CPU 102, command 510 can be considered as loaded prior in time to command 530, for example. However, as described further below, GPU 122 in some embodiments can issue the launch commands loaded into pushbuffer 150 out of order, to make efficient use of processing resources in system 100.

In pushbuffer 150, commands 540, 550, and 560 are sequentially loaded launch commands for sets 440, 450, and 460, respectively. Pushbuffer commands 540, 550, and 560 include commands that specify dependencies on previously loaded launch commands.

Specifically, pushbuffer command 540 specifies that set 440 cannot execute until after reference counter 215(1) indicates completion of all CTAs in set 410. Additionally, pushbuffer command 550 specifies that set 450 cannot execute until after reference counter 215(2) indicates completion of all CTAs in set 420, and pushbuffer command 560 specifies that set 460 cannot execute until after reference counter 215(3) indicates completion of all CTAs in set 430.

Further, FIG. 5 includes a pushbuffer command 570 for a set 580 of CTAs that performs a further operation after completion of execution of sets 440, 450, and 460. For example set 580 may perform a summing operation on outputs of sets 440, 450, and 460. Therefore, command 570 specifies that set 580 cannot begin execution until reference counters 215(1), 215(2), and 215(3) indicate completion of sets 440, 450, and 460.

Figure 6:
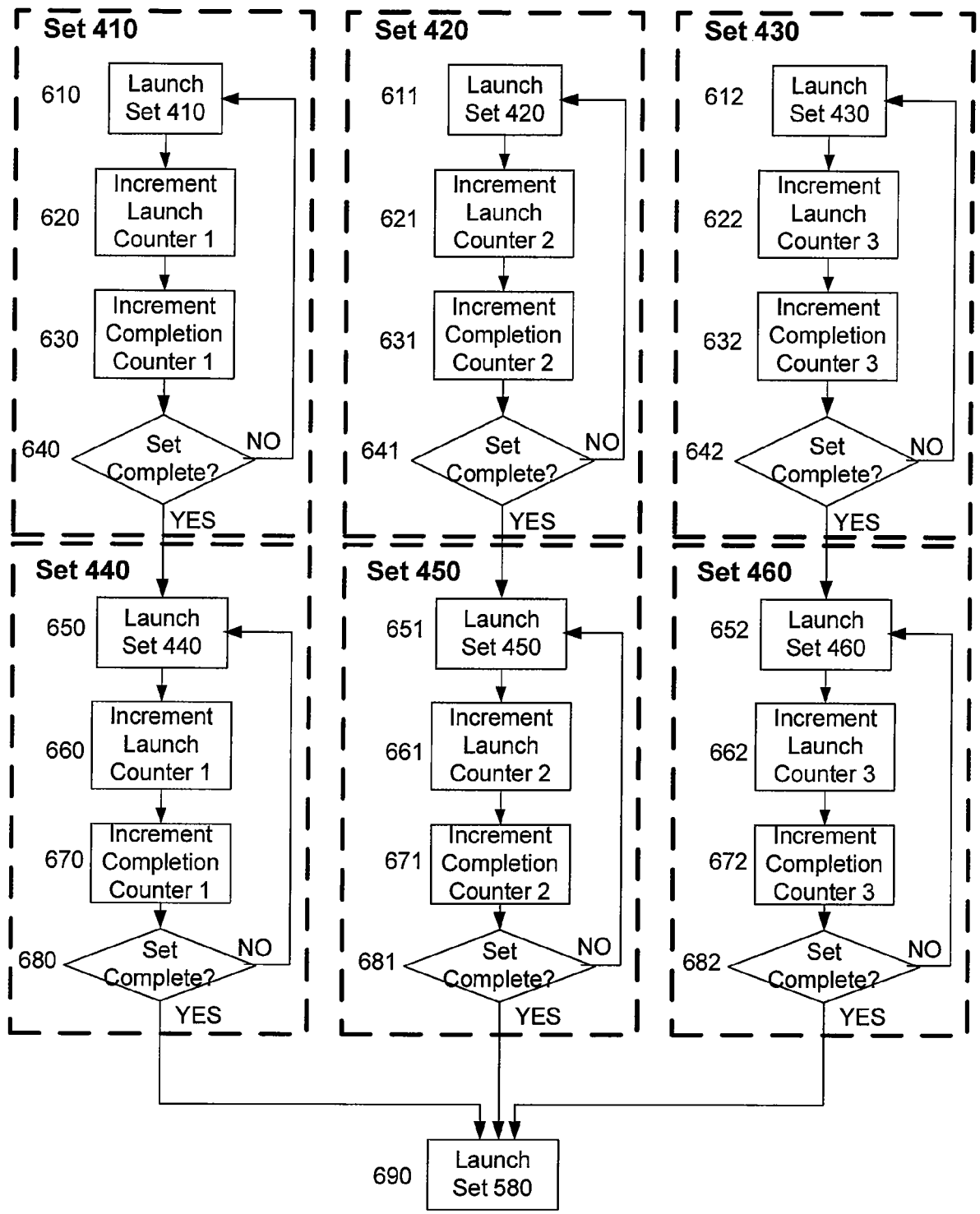
FIG. 6 illustrates processing of the series of pushbuffer 150 commands of FIG. 5 by GPU 122, in one embodiment in accordance with the present invention.

FIG. 6 illustrates processing of the series of pushbuffer 150 commands of FIG. 5 by GPU 122, in one embodiment in accordance with the present invention. As noted further below, GPU 122 autonomously determines when to launch dependent sets 440, 450, 460, and 470, based upon reference counters 215 assigned to track launch and execution of CTAs within the sets.

As an overview of FIG. 6, GPU 122 can execute one or more of sets 410, 420, and 430 independently, since sets 410, 420, and 430 use distinct reference counters 215. In particular, as set 410 executes in GPU 122, reference counter 215(1) keeps track of CTAs launched and completed in set 410. As set 420 executes, reference counter 215(2) tracks launch and execution in set 420. As set 430 executes, reference counter 215(3) tracks launch and execution in set 430. Sets 410, 420, and 430 may be of different size, and may take various amounts of time to complete execution, such that there is no particular order of completion for sets 410, 420 and 430.

Note that, depending on resources in GPU 122 and the number of CTAs in each set, the CTAs of a set may be launched all at once, or a group of CTAs (fewer than the number of CTAs in the set) may be launched in parallel. Where a group of CTAs is launched in parallel, a number of groups of CTAs are launched before a set is complete.

In addition, because set 440 is dependent upon completion of set 410, but set 440 is not dependent upon completion of set 420 or set 430, set 440 may begin executing in GPU 122 regardless of whether set 420 and/or set 430 are executing. Set 440 begins executing based on a determination from reference counter 215(1) that set 410 has completed processing. When set 440 executes, reference counter 215(1) is used to track launch and execution of CTAs in set 440. Further, set 440 can execute independently of sets 450 or 460.

Similarly, because set 450 is dependent upon set 420 but independent of sets 410, 430, 440, and 460, set 450 can execute regardless of whether sets 410, 430, and/or 440 and 460 have completed execution. GPU 122 begins executing set 450 based on a determination from reference counter 215(2) that set 420 has completed processing. When set 450 executes, reference counter 215(2) is used to track launch and execution of CTAs in set 440. As well, since set 460 is only dependent on set 430, set 460 executes independent of sets 410, 420, 440, and 450. GPU 122 begins executing set 460 after reference counter 215(3) indicates that set 430 has completed processing, and uses reference counter 215(3) to track launch and completion of CTAs in set 460.

Because set 580 is dependent upon completion of sets 440, 450, and 460, GPU 122 will not start executing set 580 until all of sets 440, 450, and 460 have completed execution, as determined by reference counters 215(1), 215(2), and 215(3), as described further below.

In detail, FIG. 6 includes the following acts. At act 610, GPU 122 launches CTAs in set 410. At act 620, the launch counter of reference counter 215(1) is incremented for each CTA in set 410 that is launched. At act 630, the completion counter of reference counter 215(1) is incremented for each CTA in set 410 that has completed execution. At act 640, if all CTAs of set 410 have not completed execution, more CTAs of set 410 are executed at act 610.

Set 420 is independent of set 410 and may be processed in parallel with set 410. Thus, GPU 122 can launch CTAs in set 420 in parallel with acts 610, 620, and/or 630, as depicted at act 611. At act 621, the launch counter of reference counter 215(2) is incremented as each CTA in set 420 is launched. At act 631, the completion counter of reference counter 215(2) is incremented for each CTA in set 420 that completes execution. At act 641, if all CTAs of set 420 have not completed execution, more CTAs of set 420 are launched at act 611.

Similarly, set 430 is independent of sets 410 and 420 and may be processed by GPU 122 in parallel with sets 410 and 420. Thus, in parallel with acts 610, 611, 620, 621, 630, and/or 631, GPU 122 launches CTAs in set 430, as depicted at act 612. At act 622, the launch counter of reference counter 215(3) is incremented as each CTA in set 420 launches. At act 632, the completion counter of reference counter 215(3) increments for each CTA in set 420 that completes execution. At act 642, if all CTAs of set 430 have not completed execution, more CTAs of set 430 are executed at act 621.

Although sets 410, 420, and 430 are described as being executed in parallel in GPU 122, GPU 122 may execute the sets serially depending upon resources in GPU 122. Additionally, GPU 122 may execute 410, 420, and 430 in parallel alongside graphics class processing in GPU 122.

With respect to set 440, if at act 640 set 410 has completed execution, as determined by reference counter 215(1) used by set 410, then at act 650, GPU 122 may launch CTAs in set 440. Because set 410 no longer needs reference counter 215(1) (set 410 has completed processing), reference counter 215(1) is used to track the launch and completion status of set 440 as CTAs of set 440 execute. At acts 660 and 670, the launch counter and completion counter of reference counter 215(1) are incremented as CTAs launch and finish execution. At act 680, if set 440 has not completed execution, more CTAs of set 440 are executed at act 650.

For set 450, if at act 641 set 420 has completed execution as determined by reference counter 215(2) used by set 420, then at act 651, CTAs in set 450 may be launched by GPU 122. Reference counter 215(2) is used to track the launch and completion status of set 450 as CTAs of set 450 execute. At acts 661 and 671, the launch counter and completion counter of reference counter 215(2) increment as CTAs launch and finish execution. At act 681, if set 450 has not completed execution, more CTAs of set 450 are executed at act 651.

Similarly for set 460, if at act 642 set 430 has completed execution, as determined by reference counter 215(3) used by set 430, then at act 652, GPU 122 may launch CTAs in set 460. Reference counter 215(3) tracks the launch and completion status of set 460 as CTAs of set 460 execute. At acts 662 and 672, launch and completion counters of reference counter 215(3) increment as CTAs launch and finish execution. At act 682, if set 460 has not completed execution, more CTAs of set 460 are executed at act 652.

Although sets 440, 450, and 460 are described as being executed in parallel in GPU 122, GPU 122 may execute the sets serially depending upon resources in GPU 122. Additionally, GPU 122 may execute 440, 450, and 460 in parallel alongside graphics class processing in GPU 122.

As described above, set 580 cannot begin execution until sets 440, 450, and 460 have completed processing, as indicated by reference counters 215(1), 215(2), and 215(3). Before launching set 580, GPU 122 in some embodiments performs an AND of the completion status of reference counters 215(1), 215(2), and 215(3) to check the completion status of sets 440, 450, and 460. In other embodiments, GPU 122 increments reference counters 215(1), 215(2), and 215(3) to a particular starting value, and waits for each of reference counters 215(1), 215(2), and 215(3) to reach a specified terminal value.

Many methods may be used to determine whether the sets 440, 450, and 460 have completed processing using reference counters 215(1), 215(2), and 215(3) and are considered within the grasp of one of ordinary skill given the functional descriptions herein. For example in some embodiments, GPU 122 includes logic to provide an AND function of the completion status of some or all completion counters with a masked reduction function. Implementation of one method or another may depend upon the number of CTAs to be executed in a set, since a method for verifying completion of execution of 10 CTAs in a set may suggest a different solution than verifying completion of execution of thousands or more of CTAs in a set.

The systems and methods described above using reference counters 215 for specifying dependencies between sets of CTAs may also be accomplished with semaphore data structures 230. However, synchronization with semaphore data structure 230 may cause front end 210 to stop issuing launch commands while waiting for the semaphore data structure 230, such that GPU 122 could become idle. Typically, a semaphore waits for other processes to flush out of the pipeline before starting more work down the pipeline. With a deep pipeline and/or many processors in GPU 122, having the pipeline and/or processors go idle may be significantly less efficient than synchronization using reference counters 215.

Therefore, utilizing reference counters 215 to specify dependencies may provide an efficiency boost to allow GPU 122 to remain busy processing launch commands in pushbuffer 150. GPU 122 need not wait for its pipelines to flush, which may occur while using semaphore data structures 230.

Pushbuffer Commands for Synchronizing CTAs

Included below are specific commands ("pb_cmd," also referred to as a "pushbuffer method" or "methods") that may be issued to pushbuffer 150 for synchronizing CTAs described above with respect to FIGS. 1 to 6, in some embodiments.

A wait command specifies conditions for the launch of a subsequent CTA or grid of CTAs. Until the condition specified in the wait command is "true" the subsequent CTA or grid of CTAs cannot launch. For example, the wait command may be based upon an occurrence of a quiescent state in GPU 122, although waiting for GPU 122 to be quiescent may be overly conservative because all previously requested CTAs would need to complete execution before the subsequent CTA can launch. The wait condition for a subsequent CTA or set of CTAs may be based on a comparison of the launch counter and the completed counter of a reference counter 215 for a previous CTA or set of CTAs. Alternatively, the launch counter and the completed counters may also be compared to a predetermined value. In this way, a launch of a subsequent CTA or grid of CTAs may occur after a predetermined number of previous threads have launched or completed.

Exemplary Pushbuffer Commands for Specifying and Using Wait Counters

SetLaunchID. This specifies a reference counter 215 (RefCnt) to be associated with subsequent CTA stream launches and completions. The reference counter 215 (RefCnt) is incremented each time an associated CTA completes.

pb_cmd SetLaunchId {
field RefCnt U04=0; // specifies the reference counter 215 ID
if (RefCnt >=Number_of RefCnts) throw ErrorInvalidValue;
};

SetRefCntValue. This sets the reference counter 215 value used by a subsequent call to ResetRefCnt or WaitRefCnt.

pb_cmd SetRefCntValue {
field V U32=0; // value used by ResetRefCnt and WaitRefCnt}
};

ResetRefCnt. This resets components of the specified reference counter 215 to the value previously set with pb_cmd SetRefCntValue. This first causes front end 210 to wait for all CTAs launched with the specified RefCnt to complete before the selected reference counter 215 is written, and takes the form:

pb_cmd ResetRefCnt action {
field RefCnt U04; // specifies the reference counter 215 ID
if (RefCnt >=Number_of_RefCnts) throw ErrorInvalidValue;
};

WaitRefCnt. This causes a wait-for-completion for all the CTAs associated with a specified reference counter 215. WaitRefCnt can wait for the counter quiescent state, for the completed counter to equal a predetermined value, or for the completed counter to reach or exceed a certain value:

Pb_cmd WaitRefCnt action {
field Compare enum<4>{
Count_Quiescent=0; // wait until completed counter=launch counter (the reference counter 215 is idle although other reference counters 215 may be still executing)
Value_Equal=1; // wait until completed counter==value or until counter is quiescent
Value_Clockhand=2; // wait until (completed counter–value)<0x8000_0000 using unsigned 32-bit arithmetic, or until counter is quiescent
};
field RefCnt U04; // specifies the reference counter 215 ID
if (RefCnt >=Number_of RefCnts) throw ErrorInvalidValue;
};

The following exemplary method creates a thread dependency so that a subsequent CTA or set of CTAs will depend upon and wait for a previously launched CTA or set of CTAs to complete processing. The method uses a pushbuffer command WaitRefCnt that waits for specified CTAs to complete. The method optionally uses a semaphore data structure 240 to "flag" another process when the first CTA or set of CTAs has completed processing. Set 2 waits until the appropriate reference counter 215 reaches the specified condition, which may require using the value previously set by pb_cmd SetRefCntValue. The first set of CTAs generates input for the second set of CTAs, with notification of completion of the first set being set using reference counter 215(1):

(0) optionally define a semaphore at a given memory location via pb_cmd DefineSemaphore;

(1) optionally "flush out" CTAs using RefCnt1 (and wait for CTAs currently using RefCnt1 to complete processing), by using pb_cmd ResetRefCnt.Cnt=1;

(2) associate subsequent CTAs with RefCnt1, by using pb_cmd SetLaunchID.RefCnt=1;

(3) launch first set of CTAs, using pb_cmd Launch;

(4) wait for the first set of CTAs to complete, by using pb_cmd WaitRefCnt.RefCnt=1;

(5) optionally release another process waiting on a semaphore with pb_cmd ReleaseSemaphore;

(6) launch second set of CTAs, using pb_cmd Launch.

The method optionally releases a semaphore to indicate to another process when the first launched CTAs are complete. Here, pb_cmd ReleaseSemaphore may be used to release another process waiting on a semaphore when status is needed on when a group of CTAs is complete. There may also be a pb_cmd AcquireSemaphore to wait for another process to release a semaphore. When the output of a group of CTAs is used as input to subsequent dependent CTAs, but intervening CTAs are launched, semaphores are not required, because pb_cmd WaitRefCnt waits for a first set of CTAs to complete before launching a dependent set of CTAs.

Waiting for a first set of CTAs to complete processing before executing a subsequent dependent grid of CTAs may underutilize resources in the system. Therefore, GPU 122 includes provisions for launching interleaving CTAs or grids of CTAs that are not dependent upon the previous CTAs or grids of CTAs.

Where a first set of CTAs generates input for a dependent second set of CTAs, a pb_cmd WaitRefCnt may be used to cause the second set of CTAs to wait for the completion of the first set. Following pb_cmd WaitRefcnt, a semaphore may optionally be released to notify another process that the first set of CTAs has completed.

However, a third set of CTAs independent of the results of CTA set 1 may launch after CTA set 1 has launched but before CTA set 1 has completed processing. The following illustrates this:

(0) optionally define a semaphore at a given memory location via pb_cmd pb_cmd DefineSemaphore;

(1) optionally flush out CTAs using RefCnt1, (wait for CTAs currently using RefCnt1 to complete processing), by using pb_cmd ResetRefCnt.Cnt=1;

(2) launch CTA set 1, using pb_cmd Launch;

(3) associate CTA set 2 with a different reference counter, using pb_cmd SetLaunchID.RefCnt=2;

(4) launch CTA set 2, using pb_cmd Launch;

(5) wait for CTA set 1 to complete, by using pb_cmd WaitRefCnt.RefCnt=1;

(6) optionally release a semaphore with pb_cmd ReleaseSemaphore;

(7) launch CTA set 3, using pb_cmd Launch.

Launching Threads

In some embodiments, in the case of launching more than one CTA, state information may include the number of CTAs to be launched. State information may take the form of a grid (e.g., 1-dimensional or 2-dimensional), which describes the shape of the grid as opposed to the shape of threads forming the CTA. Further, state information may include information on how the threads are numbered and how CTAs are numbered.

In some embodiments, CTAs or sets of CTAs may be automatically launched, based merely upon the writing of certain parameters into pushbuffer 150. For example, a CTA may be associated with RefCnt1 with 8 parameters. The act of writing the 8th parameter in pushbuffer 150 triggers an automatic launch of the CTA.

As another example, CPU 102 can write blocks of state information to set up a CTA and specify that the CTA is automatically launched when CPU 102 writes parameter P2. CPU 102 writes parameters P0, P1, and P2, and the CTA is launched as soon as GPU 122 sees P2. Therefore, CPU 102 can write a series of values to the parameter P2, each time with a different parameter for P2, and each time CPU 102 writes to P2 the CTA will run with a different value of P2. In other words, every instance of the CTA may be the same except for the setting of the parameter P2.

The automatic launch method is particularly advantageous where relatively few parameters are required to configure and launch the CTA. Because CPU 102 need not specify explicit launch state information, the automatic launch method can save significant space in pushbuffer 150. Further, automatic launch allows a CTA to be launched with each clock cycle.

The following pushbuffer command, pb_cmd Launch, launches a stream of CTAs with the same program and parameters. In some embodiments, this pb_cmd launches a single CTA, with no automatically generated parameters, but with a number of user-supplied parameters as determined by pb_cmd SetParameterSize.Count. In other embodiments, this method launches a stream of CTAs arranged in a grid with automatically generated parameters that specify flags, CTA dimensions D0, D1, D2, grid raster width and height, and CTA block (x, y) position in the grid, followed by a number of user-supplied parameters as determined by pb_cmd SetParameterSize.Count. The number of block CTAs per stream launch is specified with pb_cmd parameters SetCtaRastersize.Height and SetCtaRastersize.Width.

```
pb_cmd Launch action {
field V U32; // pb_cmd argument unused
DoCtaLaunchCheck( ); // do launch checks prior to CTA
    stream launch
};
```

The following pushbuffer command configures a CTA stream launch to require an explicit (manual) call of pb_cmd Launch( ), or enables an automatic launch. An automatic launch is triggered when Parameter[AutoLaunchIndex] is written. A manual launch may also be called when automatic launches are enabled.

```
pb_cmd SetLaunchControl {
field Launch enum<8>{
    MANUAL_LAUNCH=0; // invoke Launch explicitly
    AUTO_LAUNCH=1; // enable automatic Launch on
        write of
Parameter[AutoLaunchIndex].
}=MANUAL_LAUNCH;
};
```

The following pushbuffer command initializes the user-supplied parameter values passed to each CTA when it is launched. When SetLaunchControl.Launch==AUTO_LAUNCH, writing Parameter[AutoLaunchIndex] triggers an automatic launch of a stream or grid of CTAs, or one CTA if the grid rasterizer is disabled.

```
pb_cmd Parameter[Number_of_Cparameters] action {
field V U32; // parameter value
DoCtaAutoLaunchCheck( ); // do checks prior to CTA
    stream auto-launch
};
```

The number or count of user-supplied 32-bit parameters passed to each CTA may be specified with the following pushbuffer command SetParameterSize, which also sets the auto-launch parameter position AutoLaunchIndex. When SetLaunchControl.Launch=Auto_Launch, a write to Parameter[AutoLaunchIndex].V triggers an automatic CTA stream launch. CPU 102 may specify each CTA individually by passing each CTA one or more unique parameter values:

pb_cmd SetParameterSize { field AutoLaunchIndex U08=0; // parameter write position in 32-bit words field Count U08=0; // total parameter count in 32-bit words if ((AutoLaunchIndex >=Count && AutoLaunchIndex !=0) || Count>

Number_of_CParameters) throw ErrorInvalidValue;

};

ALTERNATIVE EMBODIMENTS

The systems and methods described above may also be applied to synchronize multiple GPUs 122, in some embodiments. For example, certain compute class applications may be more efficiently executed in multiple GPUs 122 as opposed to being executed in a single GPU 122. For example, where each of the row computations of sets 410, 420, and 430 are performed by three parallel GPUs (e.g., set 410 processed by GPU1, set 420 processed by GPU2, and set 430 processed by GPU3), semaphore data structure 230 can be used so that a first GPU can signal to other GPUs that a process has completed processing.

In a conventional system, processing work is typically allocated roughly equally and launched at "about" the same time, so that parallel processes such as sets 410, 420, and 430 will finish at about the same time. However, such a priori division of processing can be an inefficient use of resources in GPU 122, for example.

In some embodiments, to make more efficient use of processing resources, GPU 122 can execute processes out of order with respect to the order of launch commands in pushbuffer 150. Front end 210 (FIG. 2) is configured to "look ahead" in pushbuffer 150 and evaluate dependencies between launch commands, for example by evaluating reference counter IDs assigned to the processes loaded in pushbuffer 150. Front end 210 can thereby launch processes in GPU 122 out of order with respect to the order of launch commands in pushbuffer 150.

For example with respect to FIGS. 5 and 6, front end 210 may determine that launch commands for set 440, set 450, and set 460 are queued up in pushbuffer 150, waiting for completion of sets 410, 420, and 430, respectively. From the dependencies specified in pushbuffer 150, front end 210 can determine to launch any of set 440, set 450, and set 460 out of order with respect to the order of the respective launch commands in pushbuffer 150. Front end 210 can determine, for example, that because set 450 does not depend on reference counter 215(1), that set 450 can be launched regardless of the state of reference counter 215(1). In this fashion, set 450 can launch after completion of set 420 (and even before set 410 is launched).

Although the invention has been described with respect to specific embodiments, it will be appreciated that the invention is intended to cover all modifications and equivalents within the scope of the following claims.

What is claimed is:

1. A method, comprising:

executing a first set of thread arrays in a processor, wherein the first set of thread arrays comprises a first set of thread groups, wherein thread groups from the first set of thread groups execute, in parallel, instructions associated with the first process, and wherein a first set of thread groups is associated with a first reference counter that increments upon completion of execution of each thread group from the first set of thread groups;

specifying a second set of thread arrays as dependent on a status of execution of the first set of thread arrays; and delaying execution of the second set of thread arrays in the processor based on the status of execution of the first set of thread arrays, wherein delaying execution of the second set of thread arrays further comprises:

counting a number of thread groups that have completed execution in the first set of thread arrays; and delaying until the number of thread groups that have completed execution equals a number of thread groups in the first set of thread arrays.

2. The method of claim 1 wherein the status of execution of the first set of thread arrays includes an indication that each thread array in the set has completed execution.

3. The method of claim 1 wherein delaying execution comprises determining based on a comparison of a launch counter and a completion counter whether the first set of thread arrays has completed execution.

4. The method of claim 1 wherein executing the first set of thread arrays comprises incrementing a launch counter for each launched thread array in the first set of thread arrays.

5. The method of claim 1 wherein executing the first set of thread arrays comprises incrementing a completion counter for each thread array in the first set of thread arrays that has completed execution.

6. The method of claim 1 further comprising, while delaying execution of the second set of thread arrays, executing a third set of thread arrays in the processor.

7. A method, comprising:

loading from a central processing unit into a pushbuffer coupled to a processing unit:

a first launch command for a first process, wherein the first launch command is to be executed by a first set of thread groups, wherein thread groups from the first set of thread groups operate in parallel to execute instructions associated with the first process, and wherein the first set of thread groups is associated with a reference counter, the reference counter being incremented upon completion of execution of each of the thread groups from the first set of thread groups, a second launch command for a second process, wherein the second launch command is to be executed by a second set of thread groups, and wherein thread groups from the second set of thread groups execute in parallel instructions associated with the second process, and a dependency between the first process and the second process, wherein the dependency associates the first reference counter with the second launch command;

executing the first launch command in the processing unit; and delaying execution of the second launch command in the processing unit based on the dependency, wherein execution of the second launch command is delayed until the first reference counter equals a number of thread groups in the first set of thread groups used to execute instructions associated with the first process.

8. The method of claim 7 wherein the dependency between the first process and the second process includes an indication that the first process has completed execution.

9. The method of claim 7 wherein delaying execution comprises determining based on a comparison of a launch counter and a completion counter whether the first process has completed execution.

10. The method of claim 7 wherein the reference counter further comprises a launch counter, and wherein executing the first launch command comprises incrementing the launch counter for each launched thread group in the first set of thread groups in the first process.

11. The method of claim 8 wherein the reference counter further comprises a completion counter, and wherein executing the first process comprises incrementing the completion counter for each thread group in the first set of thread groups in the first process, and wherein delaying execution of the second launch command further comprises delaying the execution of the second launch command until the completion counter equals the launch counter.

12. The method of claim 7 further comprising, while delaying execution of the second command, executing a third process in the processor.

13. A system, comprising:
a central processing unit configured to generate:
    a first launch command for a first process, wherein the first launch command is to be executed by a first set of thread groups, wherein thread groups from the first set of thread groups operate in parallel to execute instructions associated with the first process, and wherein the first set of thread groups is associated with a reference counter, the reference counter being incremented upon completion of execution of each of the thread groups from the first set of thread groups,
    a second launch command for a second process, including a dependency of the second process upon the first process, wherein the second launch command is to be executed by a second set of thread groups, wherein thread groups from the second set of thread groups execute, in parallel, instructions associated with the second process, and
    a third launch command for a third process, wherein the third launch command is to be executed by a third set of thread groups, wherein thread groups from the third set of thread groups execute, in parallel, instructions associated with the third process;
a pushbuffer coupled to the central processing unit, the pushbuffer configured to sequentially receive the first, second, and third launch commands; and
a processing unit configured to:
    execute the first launch command to complete the first process,
    delay execution of the second launch command based on the dependency; and
    execute the third launch command while the second process is delayed.

14. The system of claim 13 wherein executing the third launch command for the third process while the second process is delayed comprises utilizing resources in the processing unit that would not otherwise be utilized.

15. The system of claim 13 wherein executing the third launch command comprises executing instructions out of order in the processing unit with respect to an order of launch commands in the pushbuffer.

16. The system of claim 13 wherein executing the third launch command comprises determining that the third process may execute while the second process is delayed.

17. The system of claim 15 wherein the processing unit includes logic configured to determine that the third process is not dependent upon a result of the first process or the second process.

18. The system of claim 17 wherein the logic is configured to determine that the third process is not dependent upon a result of the first process by analyzing a reference counter identifier assigned to the first process.

* * * * *